United States Patent
Agata et al.

[11] Patent Number: 6,031,444
[45] Date of Patent: Feb. 29, 2000

[54] CONNECTOR-INTEGRATED COIL APPARATUS

[75] Inventors: Naoto Agata, Toyoake; Hiroyasu Sakamoto, Kariya; Masashi Tobayama, Chiryu, all of Japan

[73] Assignee: Denso Corporation, Japan

[21] Appl. No.: 09/274,994

[22] Filed: Mar. 24, 1999

[30] Foreign Application Priority Data

Mar. 25, 1998 [JP] Japan .................................. 10-076771

[51] Int. Cl.[7] ............................. H01F 27/29; H01R 13/00
[52] U.S. Cl. ........................ 336/192; 336/198; 439/486; 439/874
[58] Field of Search ................................. 336/192, 198, 336/208; 335/126; 439/486, 736, 874

[56] References Cited

U.S. PATENT DOCUMENTS

| | | | |
|---|---|---|---|
| 4,954,801 | 9/1990 | Urbanski et al. | 336/90 |
| 5,363,033 | 11/1994 | Suda et al. | 324/207.15 |
| 5,465,911 | 11/1995 | Hall | 239/585.4 |
| 5,689,182 | 11/1997 | Togo et al. | 324/207.15 |

FOREIGN PATENT DOCUMENTS 7-127663  5/1995  Japan .

*Primary Examiner*—Lincoln Donovan
*Assistant Examiner*—Anh Mai
*Attorney, Agent, or Firm*—Nixon & Vanderhye PC

[57] ABSTRACT

A connector-integrated coil apparatus that includes a stress-absorbing elbow segment that minimizes the chance of coil breakage. A fusing portion of a coil terminal wire and a terminal is located within a coupler rather than the interface between a metal housing and the resin coupler. Further, the fusing portion is located between a stress-absorbing elbow segment of the coil terminal wire and a tip of the terminal. Accordingly, even if stress is caused by a difference of thermal expansion coefficients between the housing and the coupler, the stress is absorbed by the stress-absorbing elbow segment. Accordingly, breakage of the coil terminal wire at the fusing portion is prevented.

12 Claims, 4 Drawing Sheets

CONNECTOR-INTEGRATED COIL APPARATUS

CROSS-REFERENCE TO RELATED APPLICATION

This application relates to and claims priority from Japanese Patent Application No. Hei. 10-76771 filed on Mar. 25, 1998, the entire contents of which are incorporated herein by reference.

BACKGROUND OF THE INVENTION

1. Field of the Invention

The present invention relates to a connector-integrated coil apparatus which is most suitable for a connector-integrated stator of a magnetic clutch.

2. Related Art

A known connector-integrated stator for a magnetic clutch is disclosed in JP-A-7-127663. As shown in FIGS. 3 and 4, a spool 101 housed within a metal housing 106 includes a magnetic coil 102 wound therearound, with a coil terminal wire 103 extending from the coil. Also, a connector 104 is connected to the housing 106, and includes an external connecting terminal 105. The connector 104 includes a coupler 107 formed by injecting mold resin within the housing 106 after the terminal 105 is bent to a predetermined shape, with the reference numerals 111, 112 referring to a bottom side curved portion and a top side curved portion of the terminal 105 (see FIG. 4).

The coil terminal wire 103 is electrically spliced with the terminal 105 via an insulation coating film covering the end portion of the coil terminal wire 103. More specifically, an electrode is supplied with current and pressed to a fusing portion 109 created by the end portion of the coil terminal wire 103 coated by the insulating coating film being inserted into a claw portion of the terminal 105.

In such a structure, the fusing portion 109 has conventionally been positioned close to a distal end of the terminal 105 so that the terminal 105 can be readily bent after the coil terminal wire 103 and the terminal 105 are fused to prevent the coil terminal wire 103 from being damaged, and to provide the fusing portion 109 at the distal end of the terminal 105 to prevent the section of the coil terminal wire 103 extending from the coil from being disjointed.

However, the fusing portion that connects the coil terminal wire 103 with the terminal 105 corresponds to an interface between the resin coupler 107 and the metal housing 106.

When the coupler 107 and the housing 106 are filled with mold resin to cover the fusing portion 109 of the terminal 105, a difference in the thermal expansion coefficients is generated between the coupler 107 and the housing 106, as the mold resin within the housing 106 is restricted by the housing 106 during expansion and contraction caused by temperature changes.

As a result, the coil terminal wire 103 may be broken due to the stress concentrated on a coil curved portion 110, as shown in FIG. 5.

SUMMARY OF THE INVENTION

The present invention is made in light of the foregoing problem, and it is an object of the present invention to provide a connector-integrated coil apparatus which reduces an influence caused by the difference in the thermal expansion coefficients between the metal coil housing and the resin coupler.

According to the present invention, the coil terminal wire has a stress-absorbing elbow segment between a coil portion and a fusing portion which connects the coil terminal wire and an external terminal. Accordingly, even if the thermal expansion or contraction occurs due to temperature change, the stress is absorbed by the stress-absorbing elbow segment, and breakage of the coil terminal wire is prevented.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
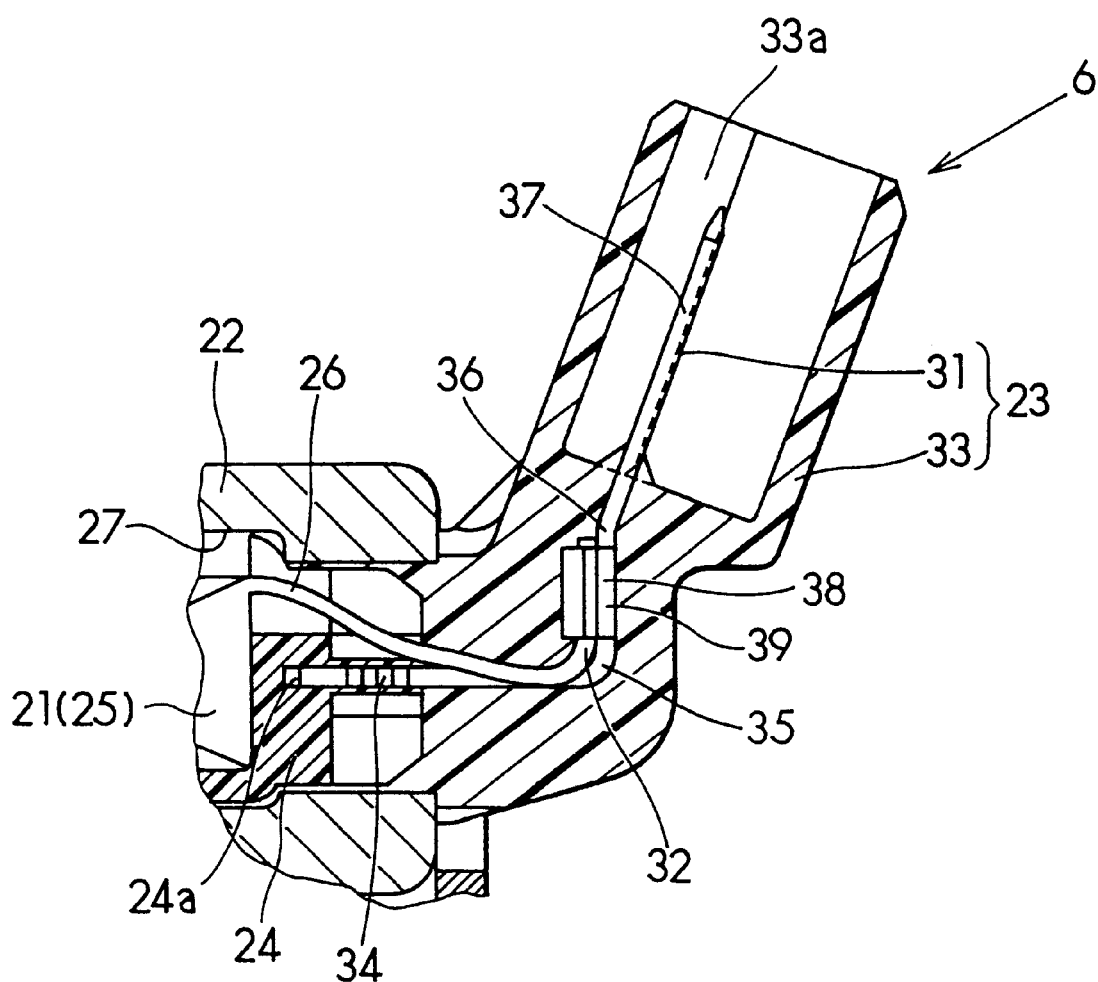
FIG. 1 is a sectional view showing a main part of a connector-integrated stator for a magnetic clutch according to an embodiment of the present invention.
Figure 2:
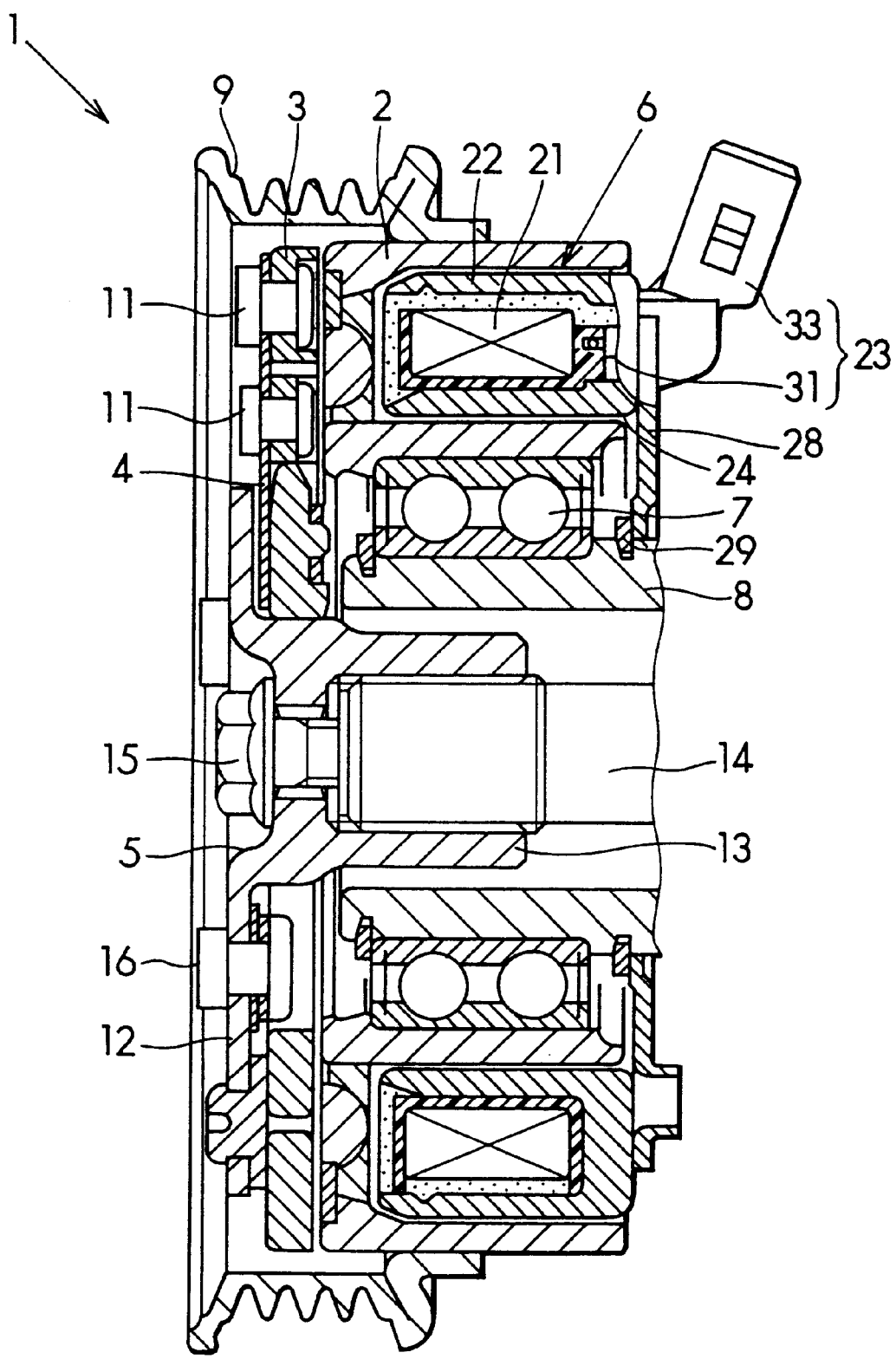
FIG. 2 is a sectional view showing the overall structure of the magnetic clutch according to the embodiment of the present invention.
Figure 3:
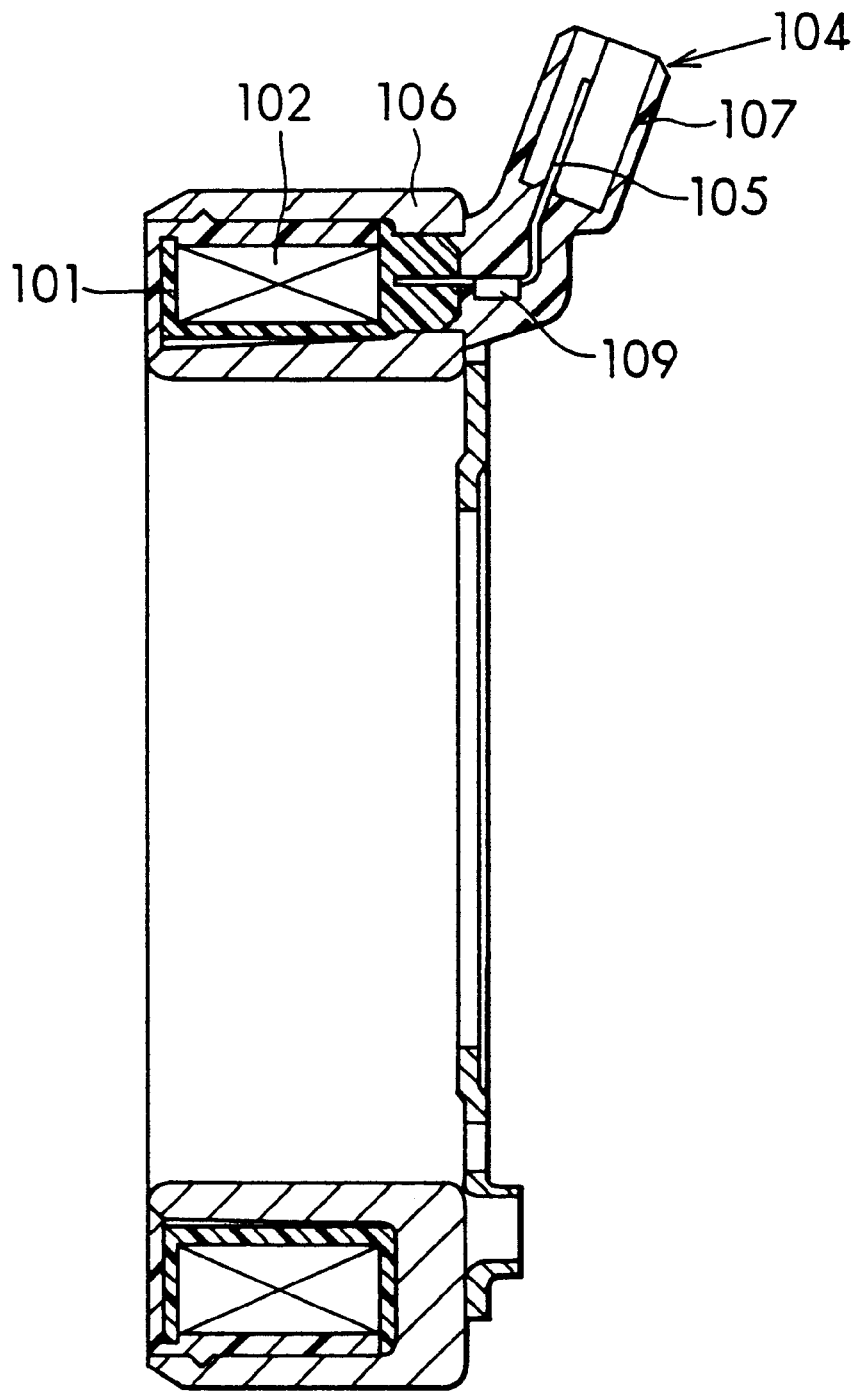
FIG. 3 is a sectional view showing a prior art connector-integrated stator for a magnetic clutch.
Figure 4:
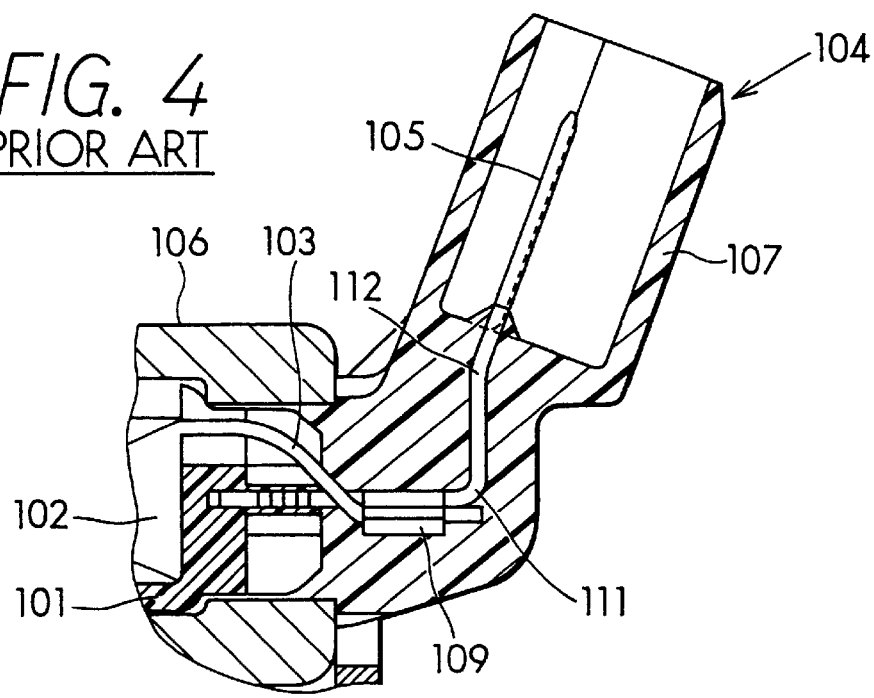
FIG. 4 is a sectional view showing a main part of the prior art connector-integrated stator for the magnetic clutch.
Figure 5:
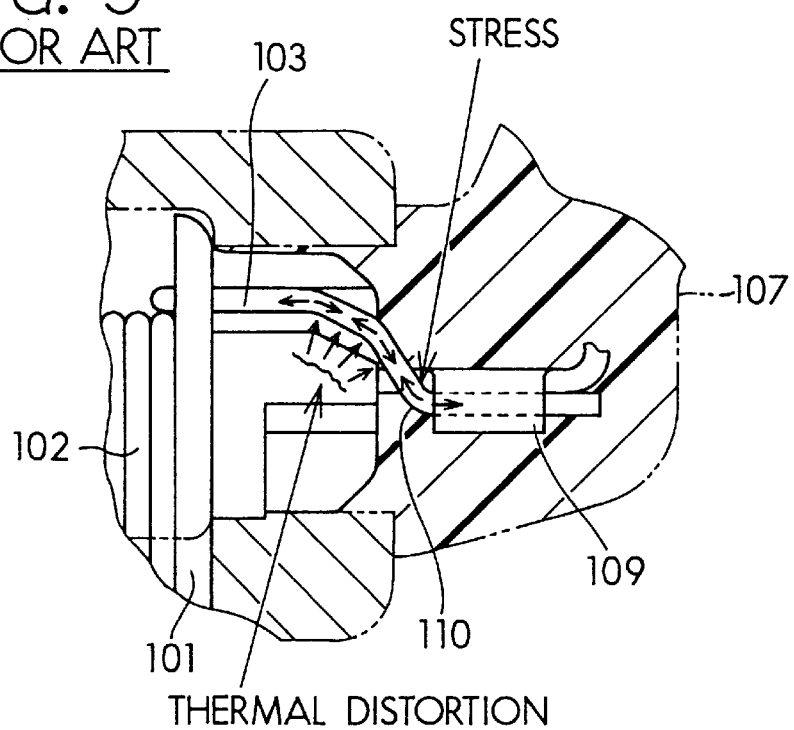
FIG. 5 is an enlarged sectional view of a part of the prior art stator shown in FIG. 4.

FIGS. 1 and 2 show an embodiment of the present invention, wherein FIG. 1 shows a main part of a connector-integrated stator for a magnetic clutch, and FIG. 2 shows the entire structure of the magnetic clutch.

Referring to FIGS. 1 and 2, the magnetic clutch 1 of the present embodiment is a power transmission unit mounted on a refrigeration compressor in a vehicular air conditioner. The clutch connects/disconnects the compressor to/from an internal combustion engine.

The magnetic clutch 1 includes a rotor 2 rotated by rotary power transmitted from the engine, an armature 3 disposed opposite the rotor 2 in the axial direction, an inner hub 5 for supporting the armature 3 via a plate spring 4, and a connector-integrated stator 6 for a magnetic clutch.

The rotor 2 is ring-shaped and has a U-shaped cross section (with an opening toward the right in FIG. 2) to accommodate the connector-integrated stator 6 for the magnetic clutch, and is rotatably supported at the outer periphery of a compressor housing 8 via bearings 7 disposed at the inner periphery thereof.

A pulley 9 is secured at the outer peripheral surface of the rotor 2 by welding or the like so that it is rotated by the rotary power of the engine transmitted by a multistage V belt (not shown) rotated by the pulley 9. One end surface of the rotor 2 opposite the armature 3 in the axial direction is set as a friction surface.

The armature 3 consists of concentric inner and outer rings separated by a predetermined distance. The armature 3 is fixed to the non-magnetic plate spring 4 by respective rivets 11 and is disposed opposite the friction surface of the rotor 2 in the axial direction, with an end surface thereof opposite the rotor 2 being set as a friction surface.

The inner hub 5 has a plate portion 12 whose plan view has a generally triangular shape, with the inner hub including a cylindrical portion 13 provided at the center part of the plate portion 12. The cylindrical portion 13 is fixed by a bolt 15 by fitting the cylindrical portion 13 to the end portion of a rotary shaft 14 of the refrigeration compressor. The above-mentioned plate spring 4 is fixed to the plate portion 12 of the inner hub 5 by rivets 16.

The connector-integrated stator 6 corresponds to the connector-integrated coil apparatus of the present invention, and includes a magnetic coil 21 which generates magnetic force when a current is supplied, a housing 22 for supporting the magnetic coil 21, and a connector 23 integrally formed with the housing 22. The magnetic coil 21 comprises a coil portion 25 and coil terminal wires 26.

A coil wire coated by an insulating coating film is wound around a spool 24 formed of thermoplastic resin (e.g., nylon resin) to form the coil portion 25. The coil terminal wires 26 extend outside of the spool 24 from the both ends of the coil portion 25.

The housing 22 is made of a magnetic material such as iron to form a magnetic circuit of the magnetic coil 21 together with the rotor 2 and the armature 3 which are also made of magnetic materials. An open end of the housing 22 has a ring-shaped accommodating portion 27 for accommodating the coil portion 25 of the magnetic coil 21. The other end surface of the housing 22 is secured to a ring-shaped arm support 28 by welding or the like, and is positioned in the axial direction by the arm support 28 fixed to the housing 8 of the refrigeration compressor by a circlip 29.

The connector 23 includes two terminals 31 which are coupled with the end portion of the coil terminal wires 26 by means of fusing, and a coupler 33 in which the coupling portion of the coil terminal wires 26 and the terminals 31 are embedded.

According to the present embodiment, injected mold resin in the accommodating portion 27 of the housing 22 fixes the magnetic coil 21. Likewise, the resin injected into the connector 23 during the molding of the coupler 33 protects the terminals 31.

The two terminals 31 are made of a conductive material, and comprise a joint portion 34, an elbow segment 35, a claw portion 38 which is extended upward in the figure from the elbow segment 35, a tip side curved portion 36 which is bent obliquely upward in the figure from the adjacent claw portion 38 before molding, and a terminal tip 37 which extends obliquely upward in the FIG. from the tip side curved portion 36 into a cavity 33a of the coupler 33.

The joint portion 34 is located at the interface of the coupler 33 and the housing 22, and extends through an insertion hole 24a provided on the outer surface of the spool 24. The elbow segment 35 is bent upward in the figure from the end of the joint portion 34 before molding.

According to the present embodiment, the current is supplied while pressing electrodes to the claw portion after caulking and fixing the end portion of the coil terminal wires 26 at the claw portion of the two terminals 31, respectively, so as to break the insulation coating film covering the end portion of the coil terminal wire 26 by heat generated when the current is supplied to electrically connect the end portion of the coil terminal wire 26 with the claw portion of the terminals 31 (so-called fusing). The part where the coil terminal wire 26 of the magnetic coil 21 is connected to the two terminals 31 will be called a fusing portion 39 herein.

Then, according to the present embodiment, the fusing portion 39 between the coil terminal wire 26 and the terminal 31 is positioned within the coupler 33 rather than the interface between the coupler 33 and the housing 22.

The fusing portion 39 is also positioned at the position closer to the front side of the terminal 31 rather than the joint side of the coil terminal wire 26. That is, the fusing portion 39 is positioned at the position in the bending direction of the elbow segment 35 of the terminal 31 and at the position closer to the edge of the terminal 31 than the elbow segment 35 of the terminal 31. As shown in FIG. 1, elbow segment 35 defines an angle of substantially 90 degrees.

Accordingly, the fusing portion 39 is located between an elbow segment 32 and a terminal tip 37.

Next, the operation of the magnetic clutch 1 of the present embodiment will be explained briefly based on FIGS. 1 and 2.

When the current is not supplied to the magnetic coil 21, the armature 3 is retained at a position separated from the rotor 2 by the urging force of the plate spring 4, so that the rotary power of the engine which is transmitted from the multistage V belt to the rotor 2 via the pulley 9 is not transmitted to the armature 3 and the inner hub 5, and only the rotor 2 slips on the bearings 7.

When the current is supplied to the magnetic coil 21 via the terminal 31 of the connector 23, the armature 3 is attracted to the friction surface of the rotor 2 against the urging force of the plate spring 4 by magnetic force generated by the magnetic coil 21, and the armature 3 is attached to the rotor 2.

Then, the rotation of the rotor 2 is transmitted to the rotary shaft 14 of the refrigeration compressor via the armature 3, the plate spring 4 and the inner hub 5 to drive the refrigeration compressor.

As described above, the resin in the coupler 33 covers not only the surrounding of the fusing portion 39 but also the surrounding of the coil portion 25 of the magnetic coil 21. The fusing portion 39 of the coil terminal wire 26 and the terminal 31 is positioned within the coupler 33 greatly distant from the interface between the housing 22 and the coupler 33. Accordingly, stress caused by the difference of the thermal expansion coefficients between the housing 22 and the coupler 33 on the fusing portion 39 of the coil terminal wire 26 and the terminal 31 is reduced.

Further, the fusing portion 39 between the coil terminal wire 26 and the terminal 31 is located between the elbow segment 32 and the terminal tip 37.

Accordingly, even if the difference of the thermal expansion coefficients were produced in the housing 22 and the coupler 33 when the magnetic clutch 1 is activated or when it is influenced by the thermal environment around the engine, the stress concentration to the elbow segment 32 where the curved amount is larger than the prior art is reduced. In other words, because the stress is applied in the direction in which the elbow segment 32 deflects, and the stress is absorbed by the stress-absorbing elbow segment 32 formed at an angle of substantially, 90 degrees thereby preventing breakage of the coil terminal wire 26 of the magnetic coil 21.

[Other Modifications]

Although the present invention is applied to the connector-integrated stator 6 for magnetic clutch, the present invention may be applied to a connector-integrated coil apparatus for an electric rotating machine for coupling a rotor coil or a stator coil of the electric rotating machine with a terminal of a connector. The present invention may also be applied to a connector-integrated coil apparatus for an electrical apparatus such as a transformer of an ignition coil of an internal combustion engine and the like.

Although both of the fusing portions 39 of the two coil terminal wires 26 of the magnetic coil 21 and the two terminals 31 have been set at the optimum position within the coupler (mold resin) 33 according to the present embodiment, one of the fusing portions 39 for one coil terminal wire among the two coil terminal wires and one terminal among the two terminals may be located at the optimum position within the coupler (mold resin) 33 or within the housing (metal) 22.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A connector-integrated coil apparatus, comprising:
   a metal housing;
   a magnetic coil accommodated within the housing and having a coil terminal wire extending therefrom;
   a connector including a resin-molded coupler formed integrally with the housing and defining a terminal cavity;
   a connector terminal including a generally horizontally extending end portion anchored within the housing and a terminal tip disposed within the terminal cavity;
   the coil terminal wire and the connector terminal being fused together to define a fusing portion disposed intermediate said end portion and said terminal tip and embedded in the coupler, oriented generally vertically with respect to said generally horizontally extending end portion, and oriented generally vertically with respect to a generally horizontal thermal expansion direction of the resin molded coupler at a coupler/housing interface, to minimize stress on the fusing portion.

2. The apparatus of claim 1, wherein the coil terminal wire includes an elbow segment embedded within the resin-molded coupler between the fusing portion and the coil.

3. The apparatus of claim 1, wherein the connector terminal includes an elbow segment embedded within the resin-molded coupler between the fusing portion and the end portion.

4. The apparatus of claim 1, wherein both the coil terminal wire and the connector terminal include respective elbow segments embedded adjacent one another within the resin-molded coupler between the fusing portion and the coil to isolate the fusing portion from thermal expansion of the resin-molded coupler at a coupler/housing interface to thereby minimize stress on the fusing portion.

5. The apparatus of claim 1, wherein both the coil terminal wire and the connector terminal include respective elbow segments embedded adjacent one another within the resin-molded coupler, the fusing portion being located between the terminal tip and the adjacent coil terminal wire and connector terminal elbow segments.

6. A connector-integrated coil apparatus, comprising:
   a metal housing;
   a magnetic coil accommodated within the housing and having a coil terminal wire extending therefrom;
   a connector including a resin-molded coupler formed integrally with the housing and defining a terminal cavity;
   a connector terminal including an end portion anchored within the housing and a terminal tip located within the terminal cavity;
   the coil terminal wire and the connector terminal each defining a bent portion and being fused together to define a fusing portion between the terminal tip and the respective terminal and connector terminal bent portions, the respective terminal wire and connector terminal bent portions substantially isolating the fusing portion from thermal expansion of the resin-molded coupler at a coupler/housing interface.

7. The apparatus of claim 6, wherein the respective bent portions of the terminal wire and the connector terminal are positioned adjacent one another within the resin-molded coupler.

8. The apparatus of claim 6, wherein the respective bent portions of the terminal wire and the connector terminal define substantially identical angles.

9. The apparatus of claim 6, wherein the fusing portion is oriented generally vertically with respect to a generally horizontal orientation of said end portion and generally vertically with respect to a generally horizontal thermal expansion direction of the resin-molded coupler at the coupler/housing interface to minimize stress on the fusing portion.

10. A connector-integrated coil apparatus, comprising:
    a metal housing;
    a magnetic coil accommodated within the housing and having a coil terminal wire extending therefrom;
    a connector including a resin-molded coupler formed integrally with the housing and defining a terminal cavity;
    a connector terminal including an end portion anchored within the housing and a terminal tip located within the terminal cavity;
    the coil terminal wire and the connector terminal being joined together at a fusing portion embedded within the resin-molded coupler, the coil terminal wire defining a wire bending portion embedded within the coupler, and the connector terminal defining an elbow portion embedded within the coupler adjacent the bending portion, the wire bending portion and elbow portion being located between the fusing portion and the coil to isolate the fusing portion from thermal expansion of the resin-molded coupler at a coupler/housing interface.

11. The apparatus of 10, wherein the wire bending portion and the elbow portion define substantially identical angles.

12. The apparatus of 10, wherein the fusing portion is oriented generally vertically with respect to a generally horizontal orientation of said end portion and generally vertically with respect to a generally horizontal thermal expansion direction of the resin-molded coupler at the coupler/housing interface to minimize stress on the fusing portion.

\* \* \* \* \*